US012731301B2

(12) United States Patent
Skovsbøll

(10) Patent No.: US 12,731,301 B2
(45) Date of Patent: Sep. 8, 2026

(54) STABLE AND DISCERNABLE MAPPING OF CATEGORICAL DATA TO COLORS FOR GRAPHICAL DISPLAY

(71) Applicant: Crowdstrike, Inc., Sunnyvale, CA (US)

(72) Inventor: Søren Skovsbøll, Skanderborg (DK)

(73) Assignee: Crowdstrike, Inc., Sunnyvale, CA (US)

( * ) Notice: Subject to any disclaimer, the term of this patent is extended or adjusted under 35 U.S.C. 154(b) by 172 days.

(21) Appl. No.: 18/374,571

(22) Filed: Sep. 28, 2023

(65) Prior Publication Data

US 2025/0111554 A1 Apr. 3, 2025

(51) Int. Cl.
*G06T 11/10* (2026.01)

(52) U.S. Cl.
CPC .................................... *G06T 11/10* (2026.01)

(58) Field of Classification Search
CPC . G06T 11/206; G06T 11/001; G06T 2200/24; G06F 3/04847; G06F 16/287; G06F 3/04845; G06F 3/04842; G06F 3/0481; G06F 40/18; G06F 40/177; G06F 40/183; G06F 40/186; G06F 3/0482; G06F 40/103; G06F 40/174; G06F 40/106; G06F 40/197; G06V 30/413; G06Q 10/10
See application file for complete search history.

(56) References Cited

U.S. PATENT DOCUMENTS

2011/0305386 A1* 12/2011 Wang ........................ H04N 1/56
382/164
2012/0057781 A1* 3/2012 Morovic ................... G06T 7/90
382/164
2017/0329964 A1* 11/2017 Ikeda ...................... G06F 21/55

OTHER PUBLICATIONS

Diana Ramos, “How to Make and Customize Pie Charts in Excel”, smartsheet, https://www.smartsheet.com/pie-chart-excel?srsltid=AfmBOooLhc1bqvdzOOn-vZ_IQD8L5s43XQEGCJZbx41DT9q7vgrKhSnF (published Aug. 27, 2018) (Year: 2018).*

Screen captures from YouTube video clip entitled “Changing Chart Colors—Excel,” 6 pages, uploaded on Feb. 6, 2016 by user “Mr Gill”. Retrieved from Internet: <https://youtu.be/esxhfNmSOEM?si=I3Xchuh0FsP1c1Rv> (hereinafter referred to as “Gill”) (Year: 2016).*

* cited by examiner

*Primary Examiner* — Koosha Sharifi-Tafreshi
(74) *Attorney, Agent, or Firm* — Elliott, Ostrander & Preston, P.C.

(57) ABSTRACT

Data is received. Each datum therein has one of a plurality of categorical values associated with a categorical variable. Each datum is deterministically mapped to a respective one of a plurality of colors in a color space based on its categorical value. The color to which each datum is deterministically mapped is then transformed to yield a minimum threshold separation between the respective colors. A graphical representation comprising the color to which each datum is respectively deterministically mapped, and as transformed to yield the minimum threshold separation between the respective colors, is displayed.

17 Claims, 5 Drawing Sheets

FIG. 1
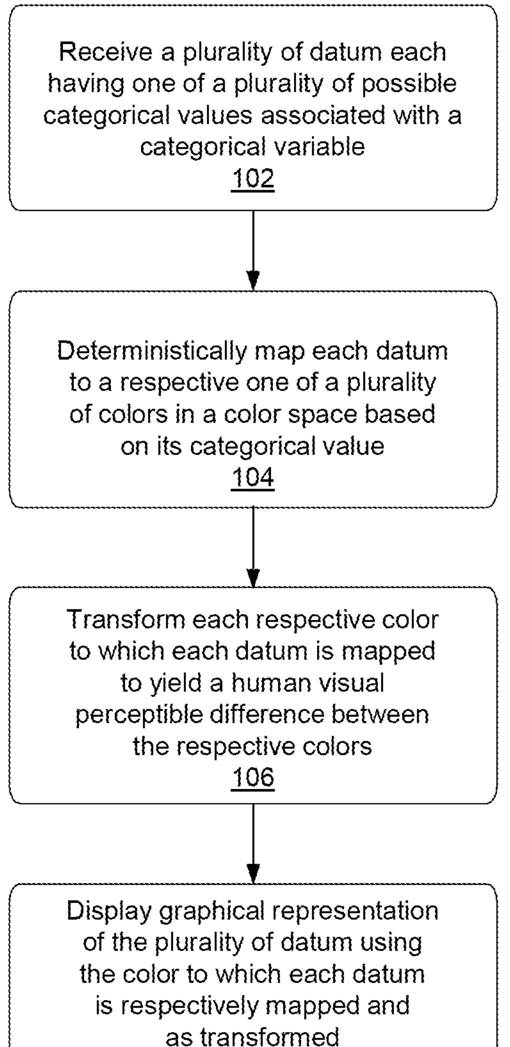

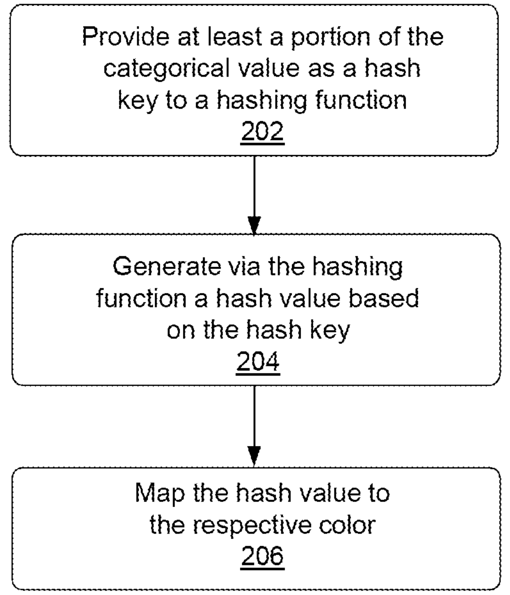
FIG. 2
104
Provide at least a portion of the categorical value as a hash key to a hashing function
202
Generate via the hashing function a hash value based on the hash key
204
Map the hash value to the respective color
206

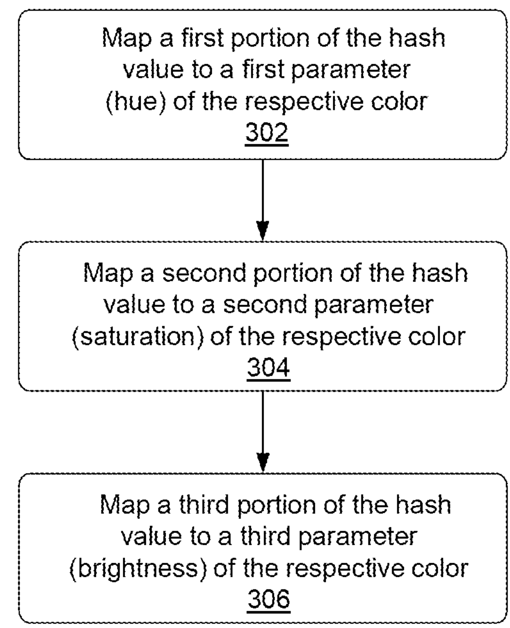
FIG. 3
206
Map a first portion of the hash value to a first parameter (hue) of the respective color
302
Map a second portion of the hash value to a second parameter (saturation) of the respective color
304
Map a third portion of the hash value to a third parameter (brightness) of the respective color
306

STABLE AND DISCERNABLE MAPPING OF CATEGORICAL DATA TO COLORS FOR GRAPHICAL DISPLAY

CROSS REFERENCE TO RELATED DOCUMENTS

N/A

TECHNICAL FIELD

Embodiments of the invention relate to digital visual representation systems, particularly the display of graphical representations of series or categorical data values mapped to consistent and distinct colors in terms of human visual perception.

BACKGROUND

In most visualization software capable of displaying graphical representations of data, for example, in the form of pie charts, bar charts or other charts, the colors to which various categories of data are mapped are selected from a limited, fixed, list of distinct colors. This makes the colors discernable, in terms of human visual perception, but not necessarily stable. For example, the same color may be used to represent two different categories of data at different times (e.g., in different generations of the same pie chart or in different pie charts), or even in the same graphical representation of the data if the number of categories of data exceeds the limited number of colors, or different colors may be used to represent the same category of data at different times.

For example, visualization software may display a pie chart in which slices of the pie chart representing different categorical values are depicted using different colors with which different respective categorical values are associated. The same color may be used to represent two different slices of the pie chart at different times, or if the number of categorical values exceeds a limited number of colors in the palette available to the visualization software, multiple slices of a pie chart may be depicted by reusing the same color, or different colors may be used to represent the same slice of the pie chart at different times.

As an example, visualization software that displays a chart that graphically represents the number of human blood donors with particular blood types that donated blood at a blood donation site over a selected period of time, e.g., a day, may use the color red to represent blood donors with blood type A, the color green to represent blood donors with blood type B, the color blue to represent blood donors with the blood type AB, and the color yellow to represent blood donors with the blood type O. The next day, or at a different blood donation site, the same software tool may use different colors to represent blood donors or certain types, such as the color yellow to represent blood donors with blood type A, the color red to represent blood donors with blood type B, the color green to represent blood donors with the blood type AB, and the color blue to represent blood donors with the blood type O. The variance from one day to the next and/or from one site to the next in the selection of colors that are mapped to the number of donors with a particular blood type makes it harder for users to recognize the color-category value connection. The users must consult the chart's legend each time to determine which colors represent the number of blood donors with particular blood types, and it therefore takes longer for users to understand the graphical representation.

Another problem is that most visualization software capable of displaying graphical representations of data may select similar or even the same colors to represent different categories of data. This is particularly true as the number of categories of data being represented in the graphical display increases or exceeds the number of colors in the palette of available colors being used to represent categories of data in the graphical display. It becomes difficult for a person to discern different colors mapped to different categories of data in a chart when the number of categories grows to 20 or 30 or more and there are necessarily subtle or perhaps no differences between at least some of the respective colors selected to depict the many different categories of data in the chart. Even if the color-category selection is stable from one chart to the next, some of the colors may not be discernable from one another, in terms of the visual perception of users, and it therefore takes longer for users to understand the graphical representation, if at all.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 shows an example flowchart of the display of graphical representations of series and/or categorical data values using consistent and distinct colors in terms of human visual perception to represent the data, according to embodiments of the invention.

FIG. 2 shows one way to accomplish a stable mapping of a plurality of datum to respective colors, according to example embodiments of the invention.

FIG. 3 shows different bytes of a hash value that may be mapped to Red-Green-Blue (RGB) color model values, Hue, Saturation, and Value (HSV) color model values (also known as Hue, Saturation, and Brightness (HSB) color model values), or Hue, Saturation, and Lightness (HSL) color model values, to produce a unique color for each categorical value, according to example embodiments.

DETAILED DESCRIPTION

Figure 4:
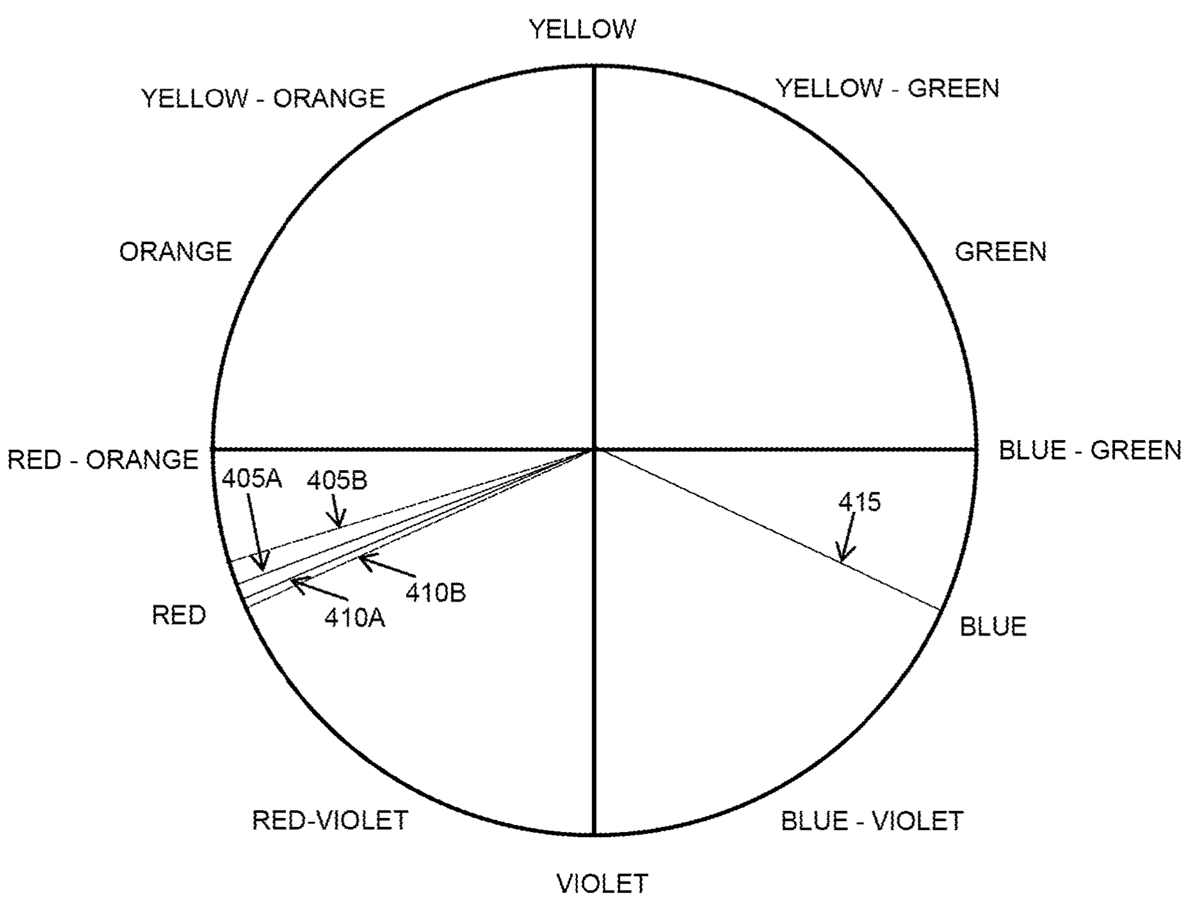
FIG. 4 shows a color wheel or color circle.

Embodiments of the invention relate to digital visual representation software systems, particularly the display of graphical representations of series and/or categorical data values as consistently represented by distinct or discernable colors in terms of human visual perception. The software receives data, in which each datum therein has one of a plurality of categorical values associated with a categorical variable. Each datum is deterministically mapped to a respective one of a plurality of colors in a color space based on its categorical value. The color to which each datum is mapped is then adjusted or transformed as may be needed to produce a visual perceptible difference in humans, or a minimum threshold separation, between the respective colors to which the data are mapped. A graphical representation, e.g., a chart, comprising the colors to which each datum is respectively mapped, and as may be adjusted or transformed to produce the minimum threshold separation between the respective colors, is then displayed in a display space, for example, a digital display screen.

FIG. 1 shows an example 100 flowchart of the display of graphical representations of series and/or categorical data values using consistent and distinct colors in terms of human visual perception to represent the data, according to embodiments of the invention. The process begins at step 102 by receiving series and/or categorical data.

"Data" is understood as the plural form of "datum", and thus "data" comprises a plurality of "datum", wherein "datum" is singular and generally means one piece of information, or information that is treated as an atomic unit for a given context. Thus, data are received at step 102. Each datum therein relates to a categorical variable, and each datum has or is assigned one of a set of possible categorical values associated with the categorical value. For example, the categorical variable may be human donor blood type and the categorical values associated with the categorical variable may be blood type A, blood type B, blood type AB, and blood type O.

At step 104, each datum is deterministically, that is, predictably, mapped to a respective one of a plurality of colors in a color space based on its categorical value. Doing so provides a stable mapping of a datum having a certain or selected categorical value to the same color each and every time the mapping occurs.

There are various ways in which a stable mapping may be accomplished. One way is to configure a one-to-one mapping between each of the categorical values and a respective color. For example, given the categorical variable of human donor blood type, a list, or two-dimensional table, or other data structure, may be created that maps the color red to represent blood donors with blood type A, the color green to represent blood donors with blood type B, the color blue to represent blood donors with the blood type AB, and the color yellow to represent blood donors with the blood type O. This two-dimensional table is then accessed each time a graphical representation of blood donor types is generated so that the same colors are used each time to represent the same blood donors of a certain blood type. However, mapping in this manner requires knowing a priori all the categorical values so that the table can be constructed, which may or may not be possible depending on the categorical variable involved.

With reference to FIG. 2, another way to accomplish a stable mapping of a data to respective colors at step 104, according to example embodiments, involves providing the categorical value in a datum, or a portion thereof, as a hash key to a hashing function at step 202. The hashing function then generates at step 204 a hash value based on the hash key, and at step 206, maps the hash value to a respective color. In this way, each datum is mapped to a unique respective color based on its categorical value, or a portion thereof. In one example the MurmurHash3, available at github.com is used, given its fast performance and low collision rate, but other hashing functions may be used, the important aspect being good distribution of the resulting hash value.

A hash function takes a key as an input, which is associated with a datum or record and used to identify it to a data storage and retrieval application. In the instant case, the data storage and retrieval application uses a datum or portion thereof as a hash key to create a hash value. The hash value is associated with or mapped to a value denoting a respective color, for example, in a hash table in data storage. The hash function may manipulate portions of the key, such as the bits of the key, so that the resulting key values are uniformly distributed over the key space and map the key values into the hash table.

A good hash function satisfies two basic properties: 1) it should be very fast to compute; 2) it should minimize duplication of output values (collisions). Hash functions rely on generating favorable probability distributions for their effectiveness, reducing access time to nearly constant. In the above example, the hash table is accessed each time a graphical representation of blood donor types is generated so that the same colors are used each time to represent the same blood donors of a certain blood type.

As noted above, a data storage and retrieval application uses the hash key obtained at step 202 to create the hash value at step 204 which is then used by the data storage and retrieval application to map the hash value to the respective color at step 206, for example, by looking up a corresponding color (or representation thereof) in a table in data storage. In one example, different bytes of the hash value may be mapped to RGB color model values.

For example, with reference to FIG. 3, a first portion of the hash value mapping of data to respective colors at step 206 may be mapped to a first parameter, e.g., the R or red parameter, of an RGB color value, or alternatively, a hue value, at step 302, a second portion of the hash value may be mapped to a second parameter, e.g., the G or green parameter, of an RGB color value, or alternatively, a saturation value, at step 304, and a third portion of the hash value may be mapped to a third parameter, e.g., the B or blue parameter, of an RGB color value, or alternatively, a brightness value, at step 306. In one example, each parameter (red, green, and blue; or, alternatively, hue, saturation and brightness) defines the intensity of the color with a value between 0 and 255. For example, if the three portions of the hash value are mapped to RGB values of 255, 0, 0 red would be displayed, because red is set to its highest value (255), and the other two (green and blue) are set to 0. In another example, if the three portions of the hash value are mapped to RGB values of 0, 255, 0 green would be displayed, because green is set to its highest value (255), and the other two (red and blue) are set to 0.

However, it is appreciated that using the hash value, or parts thereof, derived from a categorical value, to produce a unique color for each categorical value risks mapping two different categorical values to two colors in close proximity to each other in a color model or color space, since the categorical values themselves are not used in the calculation. So, while this deterministic mapping approach consistently generates a unique and distinct mapping between different categorical values and colors, there is a risk or chance that the distinct colors associated with two different categorical values are not discernable, at least in terms of human visual perception and/or in terms of what is known as a just-noticeable difference (JND). This risk increases as the number of categorical values that are being mapped to colors.

In this context, human visual perception is the ability to interpret the surrounding environment through color vision, using light in the visible spectrum reflected by objects in the environment. This is different from visual acuity, which refers to how clearly a person sees (for example "20/20 vision"). A person can have problems with visual perceptual processing even if they have 20/20 vision. The resulting perception is also known as vision, sight, or eyesight (adjectives visual, optical, and ocular, respectively).

In the branch of experimental psychology focused on sense, sensation, and perception, which is called psychophysics, a just-noticeable difference (JND) is the amount something must be changed for a difference to be noticeable, detectable at least half the time. This limen is also known as the difference limen, difference threshold, or least perceptible difference. In physiology, psychology, or psychophysics, a limen or a liminal point is a sensory threshold of a physiological or psychological response. Such points delineate boundaries of perception; that is, a limen defines a sensory threshold beyond which a particular stimulus becomes perceivable, and below which it remains unperceivable. Liminal, as an adjective, means situated at a sensory threshold, hence barely perceptible. Subliminal means below perception. The absolute threshold is the lowest amount of sensation detectable by a sense organ.

Color vision, a feature of visual perception, is an ability to perceive differences between light composed of different frequencies independently of light intensity. The visible light spectrum ranges from about 380 to 740 nanometers. Spectral colors (colors that are produced by a narrow band of wavelengths) such as red, orange, yellow, green, cyan, blue, and violet can be found in this range. These spectral colors do not refer to a single wavelength, but rather to a set of wavelengths: red, 625-740 nm; orange, 590-625 nm; yellow, 565-590 nm; green, 500-565 nm; cyan, 485-500 nm; blue, 450-485 nm; violet, 380-450 nm. Sufficient differences in wavelength cause a difference in the perceived hue; the just-noticeable difference in wavelength varies from about 1 nm in the blue-green and yellow wavelengths to about 10 nm and more in the longer red and shorter blue wavelengths.

To balance the need for stable color assignment with human visual discernibility, further processing is needed, according to embodiments. To better understand the need for further processing to ensure human visual discernibility, consider FIG. 4 which illustrates a color wheel or color circle 400. The color wheel 400 is an abstract illustrative organization of color hues around a circle that shows the relationships between primary colors, secondary colors, tertiary colors etc. In this model, colors of each hue can be represented quantitatively by a single number, corresponding to an angular position, or a radial slice, around the central axis of a color wheel or color space coordinate diagram. It is appreciated that if two categorical values are mapped to colors with similar hues that are near each other in radial slices around the central axis of the color wheel 400, the hues of such colors may not be sufficiently separated to provide human visual discernability, or to achieve a just-noticeable difference between them.

Embodiments of the invention therefore adjust or transform at step 106 the colors, or the hue of one or more colors, to create just enough, or sufficient, separation between them to provide human visual discernability, or to achieve a just-noticeable difference between them, while at the same time maintaining stability of the selected colors so the user can still take advantage of the learned association between a categorical value and a selected color. In other words, the transformation of a color, or hue of color, is minimized to achieve a just-noticeable difference but at the same time remain as close as possible to the original color, or hue of color, to which the categorical value is deterministically mapped. In some implementations, a just-noticeable difference may be defined based on a minimum threshold separation of colors, where that minimum threshold difference is used to determine whether colors are sufficiently distinct. As an example, each hue of color may be each represented by a single, distinct, number corresponding to a respective angular position on the color wheel. Thus, the hue of one color may be represented by a number n, representing a first angular position on the color wheel, and the hue of a second color may be represented by a second number, e.g., n+1, representing a nearby, second, angular position on the color wheel. In this example, assume that a minimum threshold separation of at least n+2 or n−2 between numbers representing hues of colors on the color wheel is needed to achieve a just-noticeable difference between them but at the same time remain as close as possible to the original hues of colors to which the categorical values are deterministically mapped. Thus, the first number n may be adjusted to n−1, or the second number n+1 may be adjusted to n+2, or both numbers may be adjusted sufficient to create a separation of at least n+2 between the first and second numbers representing respective hues of colors on the color wheel.

For example, presume the result of the mapping three datum each having different categorical values to a respective one of a plurality of colors in a color space based on the categorical values at step 104 produces hues of colors 405A, 410A, and 415. For the purposes of this example, it is presumed that a user can visually discern the difference between the hue of color 415 (the hue of color blue) and the hues of either of colors 405A and 410A (both hues of color red), but not so between the hues of colors 405A and 410A; for instance, the color 415 has at least a minimum threshold separation from each of colors 405A and 410A, but colors 405A and 410A do not have the minimum threshold separation from each other. For example, the hue of color 405A may be represented by a number n, representing a first angular position on the color wheel, and the hue of color 410A may be represented by a second number, e.g., n+1, representing a nearby, second, angular position on the color wheel. In this example, let's assume that a minimum threshold separation of at least n+2 or n−2 between numbers representing hues of colors on the color wheel is needed to achieve a just-noticeable difference between them but at the same time remain as close as possible to the original hues of colors to which the categorical values are deterministically mapped. Thus, the first number n may be adjusted, or the second number n+1 may be adjusted, or both numbers may be adjusted sufficient to create a separation of at least n+2 between the first and second numbers representing respective hues of colors 405A and 410A on the color wheel. Thus, in one example, embodiments adjust the hue of color 405A to the nearby hue of color 405B—moving it the direction of the hue of a red-orange color in this example, and/or adjust the hue of color 410A to 410B—moving it in the direction of the hue of a red-violet color in this example, to create sufficient separation between them to provide human visual discernability, or to achieve a just-noticeable difference between them. In one embodiment, the movement in the direction of, or adjustment to, the hue of the colors may be accomplished by increasing or decreasing the quantitative values representing the hue parameters of the colors. It is appreciated that the illustration in FIG. 4 includes just three colors to which different datum are mapped but could include many more colors to which additional datum are mapped, resulting in a crowded graphical representation, making it all the more important to adjust or transform at step 106 the colors, or the hue of one or more colors, to create just enough, or sufficient, separation between them to provide human visual discernability, or to achieve a just-noticeable difference between them, while at the same time maintaining stability of the selected colors so the user can still take advantage of the learned association between a categorical value and a selected color, and while not creating new collisions between the adjusted or transformed colors.

The color wheel model illustrated in FIG. 4 is one dimensional—a single quantitative value represents the hue of a color, corresponding to an angular position on the color wheel. A color space model is a specific organization of colors that, in combination with color profiling supported by various physical devices, supports reproducible representations of color, including digital representations. However, a color space model can be multi-dimensional, in which one of the main characteristics or parameters or properties (sometimes referred to as color appearance parameters) of a color, e.g., hue, can be represented quantitatively by a single number, corresponding to an angular position, or a radial slice, around the central axis of a color wheel or color space coordinate diagram, and another property of the color, e.g., saturation, can be represented quantitively by another number, corresponding to a radius or distance from the central axis of the color space coordinate diagram. In such an embodiment, the adjustment to the colors may be accomplished by increasing or decreasing the quantitative values representing the hue parameter of the colors and/or increasing or decreasing the quantitative values representing the saturation parameter of the colors.

Yet other properties of a color, such as brightness or lightness, can be represented in a three- or more dimensional color space model. For example, in an HSV/HSB or HSL color space model, a cylindrical space is defined in which hue and saturation are determined by respective quantitative values for angular position and radius or distance from a central axis, and brightness or lightness is represented by a quantitative value representing ranges of brightness from black at the bottom to white at the top of the cylinder. In these embodiments, the adjustment to the colors may be accomplished by increasing or decreasing the quantitative values representing the hue parameter of the colors and/or increasing or decreasing the quantitative values representing the saturation parameter of the colors, and/or increasing or decreasing the quantitative values representing the value, brightness, or lightness parameters of the colors.

Thus, embodiments may involve mapping a hash value derived from a categorical value via a hashing function to one or more parameters of the respective color. Recall from the discussion above that the data storage and retrieval application uses the hash key obtained at step 202 to create the hash value at step 204 which is then used by the data storage and retrieval application to map the hash value to the respective color at step 206, for example, by looking up a corresponding color (or representation thereof) in a table in data storage. In one example, with reference to FIG. 3, different bytes of the hash value may be mapped to RGB color model values, Hue, Saturation, and Value (HSV) color model values (also known as Hue, Saturation, and Brightness (HSB) color model values), or Hue, Saturation, and Lightness (HSL) color model values, to produce a unique color for each categorical value.

For example, a first portion of the hash value may be mapped to a first parameter, e.g., the H or hue parameter, of an HSV color model at step 302, a second portion of the hash value may be mapped to a second parameter, e.g., the S or saturation parameter, of the HSV color model at step 304, and a third portion of the hash value may be mapped to a third parameter, e.g., the V or value parameter, of the HSV color model at step 306.

Figure 5:
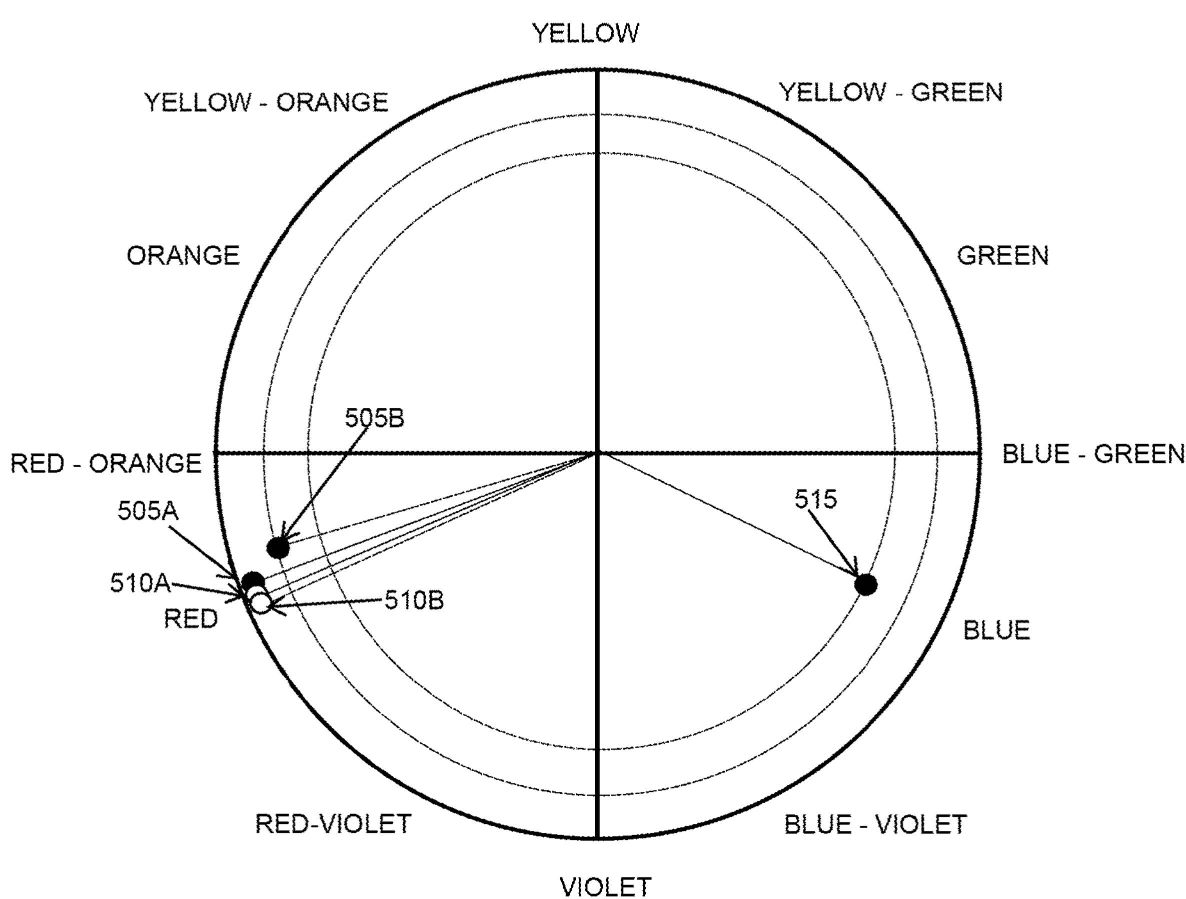
FIG. 5 shows a color space model.

Thus, in a two-dimensional color space model, with reference to the color space model 500 illustrated in FIG. 5, embodiments of the invention therefore adjust two parameters of one or more colors to create sufficient separation between them to provide human visual discernability, or to achieve a just-noticeable difference between them, while at the same time maintaining stability of the selected colors so the user can still take advantage of the learned association between a categorical value and a selected color. For example, the hue and/or saturation parameters of one or more colors is adjusted or transformed to create sufficient separation between them to provide human visual discernability, or to achieve a just-noticeable difference between them, while at the same time maintaining stability of the selected colors so the user can still take advantage of the learned association between a categorical value and a selected color.

For example, presume the result of mapping three datum each having different categorical values to a respective one of a plurality of colors in a color space based on the categorical values at step 104 produces hues and saturations of colors represented by dots 505A, 510A, and 515 in FIG. 5. It is appreciated that a user can visually discern the difference between the hue and saturation of color represented at dot 515 (the hue and saturation of blue) and the hues and saturations of either of colors represented at dots 505A and 510A (both hues and saturations of red), but not so between the hues and saturations of colors represented at dots 505A and 510A. Thus, embodiments adjust the hue and saturation of color represented at dot 505A to the nearby hue and saturation of color represented at dot 505B by moving it in an angular direction toward the hue of a red-orange color and in a radial direction closer to the center axis to change the saturation of the more red-orange color represented at dot 505B in this example, and/or adjust the hue of color represented of dot 510A to the hue of color represented at dot 510B by moving it in an opposite angular direction toward the hue of a red-violet color in this example, to create sufficient separation between the different colors represented by dots 505B and 510B to provide human visual discernability, or to achieve a just-noticeable difference between them. Note that in this example, only the hue of color represented at dot 510A is changed to the hue of color represented at dot 510B but the saturation of the color is not changed. It is appreciated that the saturation could also be changed as may be needed to create sufficient separation between them to provide human visual discernability, or to achieve a just-noticeable difference between them.

It is appreciated that the illustration in FIG. 5 includes just three colors to which different datum are mapped but could include many more colors to which additional datum are mapped, resulting a crowded or busy graphical representation with many more colors and less room or space available to move colors so that they are visually discernable to humans, making it all the more important to adjust or transform at step 106 the colors, or the hue and/or saturation, of one or more colors, to create just enough, or sufficient, separation between them to provide human visual discernability, or to achieve a just-noticeable difference between them, while at the same time maintaining stability of, and space between, the selected colors so the user can still take advantage of the learned association between a categorical value and a selected color, and while not creating new collisions or visual confusion between the adjusted or transformed colors.

In a three-dimensional color space model, such as an HSV/HSB or HSL color space model, embodiments of the invention may adjust three parameters of one or more colors to create sufficient separation between them to provide human visual discernability, or to achieve a just-noticeable difference between them, while at the same time maintaining stability of the selected colors so the user can still take advantage of the learned association between a categorical value and a selected color. For example, the hue and/or saturation and/or lightness or brightness parameters of one or more colors is adjusted or transformed to create sufficient separation between them to provide human visual discernability, or to achieve a just-noticeable difference between them, while at the same time maintaining stability of the selected colors so the user can still take advantage of the learned association between a categorical value and a selected color.

For example, given a three-dimensional color space model, mapping three datum each having different categorical values to a respective one of a plurality of colors in a color space based on the categorical values at step 104 produces the hues, saturations, and brightness/lightness of three colors. If it is determined that a human cannot visually discern the difference between the hue, saturation and brightness of two or more of the three colors, embodiments adjust or transform one or more of the hue, saturation, and brightness of one or more of the colors by moving the location of the color in the three-dimensional color space in an angular direction about the central axis (to change hue of the color), in a radial direction from the central axis (to change saturation of the color), and in a longitudinal direction along the central axis (to change brightness of the color) to create sufficient separation between them to provide human visual discernability, or to achieve a just-noticeable difference between them.

Figure 6:
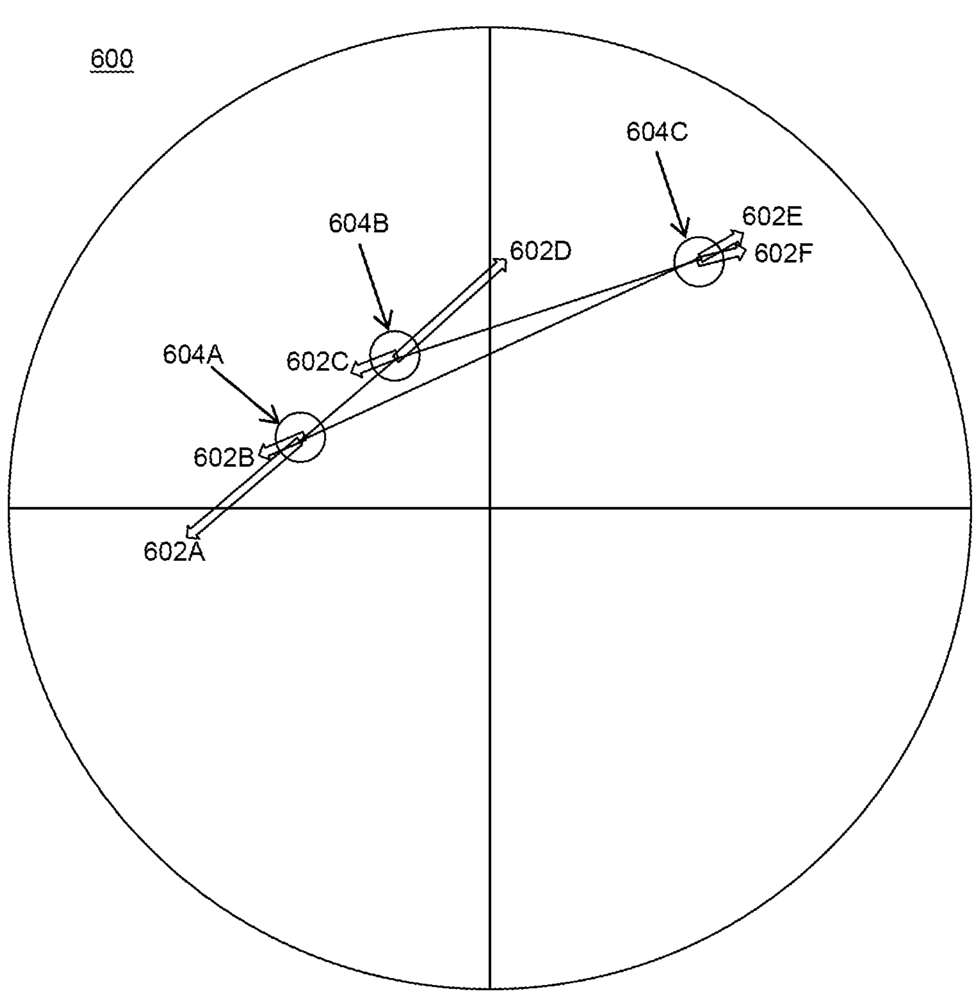
FIG. 6 shows repelling forces applied to colors in a color space model, according to example embodiments.

In the above examples, adjusting or transforming colors at step 106 may be accomplished by increasing or decreasing the quantitative values representing the hue parameter of the colors and/or increasing or decreasing the quantitative values representing the saturation parameter of the colors, and/or increasing the hue and saturation parameters of the colors, and/or increasing or decreasing the quantitative values representing the value, brightness, or lightness parameters of the colors. It is contemplated that other calculations may be used to move, adjust or transform the one or more of the quantitative values representing the hue parameter of the colors, the saturation parameter of the colors, and the value, brightness, or lightness parameters of the colors, to the extent such parameters are used in mapping a categorical value to a color in a color space model. For example, Verlet integration may be used, which is a numerical method that integrates Newton's equations of motion, frequently used to calculate trajectories of particles in computer graphics. In this example, when a new color representing a categorical value is added to a color space model, forces are applied to all the colors in the color space model through Verlet integration. These forces act to make each color repel each other color in the color model space while staying near their original location (e.g., original polar coordinates) to achieve the above stated goals of color stability and visual discernability. With reference to FIG. 6, in this example, six repelling forces 602A, 602B, 602C, 602D, 602E and 602F apply to three colors 604A, 604B and 604C in the color space 600. There are two additional forces applied to each color. Firstly, a force attracting the color towards its original position, since stability is a goal here. This first additional force prevents the color from deviating too much from its "stable" position and becoming unrecognizable. Secondly, a force attracting all colors to the center of the polar coordinate system, to the central axis, prevents repelling forces from forcing colors outwards beyond the color space model. In one embodiment, to speed up the processing of this potential n2 time and memory complexity calculation, the Barnes-Hut simulation method may be used to calculate the net force on each color in the color space. The Barnes-Hut simulation method is an approximation algorithm for performing an n-body simulation. This simulation method is notable for having order O(n log n) compared to a direct-sum algorithm which has the order O(n2).

While the above examples contemplate graphically representing categorical data, it is appreciated that series data may be graphically represented as well. For example, depending on the number of series being charted, the value of each datum in each series can be mapped via a separate hashing function. For example, if there is a single series of data, respective portions of each datum can be mapped to one or more of parameters of a color in a color space model, for example, the hue, saturation, and lightness parameters of colors in the HSL color space model. If there are two series of data, respective portions of each datum in the first series can be mapped to one or more of parameters of a color in a color space model, and respective portions of each datum in the second series can be mapped to other of the one or more parameters of a color in the color space model. For example, respective portions of each datum in the first series may be mapped to the hue parameter of colors in the HSL color space model, and the respective portions of each datum in the second series may be mapped to the saturations and/or lightness parameters of colors in the HSL color space model. Similarly, if there are three series of data, respective portions of each datum in the first series can be mapped to one or more of parameters of a color in a color space model, respective portions of each datum in the second series can be mapped to other of the one or more parameters of a color in the color space model, and respective portions of each datum in the third series can be mapped to yet other of the one or more parameters of a color in the color space model. For example, respective portions of each datum in the first series may be mapped to the hue parameter of colors in the HSL color space model, respective portions of each datum in the second series may be mapped to the saturation parameters of colors in the HSL color space model, and respective portions of each datum in the third series may be mapped to the lightness parameters of colors in the HSL color space model.

Finally, at step 108, the visualization software displays in a display space, such as a two-dimensional space (e.g., a digital display screen) or a three-dimensional display space (e.g., a digital holography display space), a graphical representation of the data, the graphical representation comprising the color to which each datum is respectively deterministically mapped and as transformed to yield the minimum threshold separation between the respective colors.

It is appreciated that RGB and HSL color space models are relatively straightforward to work with from the perspective of web technology. But these models are known to not have the property of perceptual uniformity. Perceptual uniformity is an important property in the examples discussed herein because the embodiments are trying to measure the human visual perception of colors, not their vector in a color space model itself. Human perceptual uniformity means that a numeric distance x, between two colors, a and b, anywhere in the color space model, is perceived by a human to be the same as two other colors, c and d, elsewhere in the color space also a distance of x from each other.

To achieve better accuracy in separating colors just enough to preserve stability and achieve a just-noticeable difference, or human visual discernibility, other color space models may be used. Three color spaces that are designed to optimize for perceptual uniformity are CIELAB, CIELUV and CIELCh. Each are variations of the same idea of representing colors in a color space more closely aligned with the human perception. The CIELAB color space, also referred to as L*a*b*, is a color space defined by the International Commission on Illumination (abbreviated CIE) in 1976. It expresses color as three values: L* for perceptual lightness and a* and b* for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color. The CIE 1976 L*, u*, v* color space, commonly known by its abbreviation CIELUV, is a color space adopted by the International Commission on Illumination (CIE) in 1976, as a simple-to-compute transformation of the 1931 CIE XYZ color space, but which attempted perceptual uniformity. LCh, or HCL (Hue-Chroma-Luminance) refers to any of the many cylindrical color space models that are designed to accord with human perception of color with the three parameters. These cylindrical color space models are, in general, designed to have characteristics of both cylindrical translations of the RGB color space, such as HSL and HSV, and the L*a*b* color space.

In relation to step 206 described above, mapping a hash value to a respective color, using any of the mentioned uniform color spaces requires a slightly different approach. Firstly, instead of mapping hash value bytes to H S and L components in the HSL space, colors are first encoded in the relevant components. Secondly, since these color space models are planes in three-dimensional space, all three dimensions are used during integration. There is a computing cost for this. The Barnes-Hut algorithm assumes a cartesian coordinate system, and mapping the CIELab space to a cartesian space and back requires computation too.

A computing system associated with the embodiments described herein can be a server, computer, or other type of computing device that executes one or more instances of the visualization software discussed herein. In some examples, the visualization software can be executed by a dedicated computing system. In other examples, the computing system can execute one or more instances of the visualization software via virtual machines or other virtualized instances. For instance, the computing system may execute multiple instances of the visualization software in parallel, using different virtual machines, parallel threads, or other parallelization techniques.

The computing system can include memory. In various examples, the memory can include system memory, which may be volatile (such as RAM), non-volatile (such as ROM, flash memory, non-volatile memory express (NVMe), etc.) or some combination of the two. The memory can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system. Any such non-transitory computer-readable media may be part of the computing system.

The memory can store data, algorithms, and/or any other element of the embodiments disclosed herein. The memory can also store other modules and data. The modules and data can include any other modules and/or data that can be utilized by the computing system to perform or enable performing the actions described herein. Such other modules and data can include a platform, operating system, and applications, and data utilized by the platform, operating system, and applications.

By way of a non-limiting example, the computing system that executes the visualization software may have non-volatile memory, such as an NVMe disk configured to store a file system volume, algorithms, and/or any other element of the embodiments disclosed herein. The computing system may also have volatile memory, such as synchronous dynamic RAM (SDRAM), double data rate (DDR) SDRAM, DDR2 SDRAM, DDR3 SDRAM, or DD4 SDRAM.

The computing system can also have one or more processors. In various examples, each of the processors can be a central processing unit (CPU), a graphics processing unit (GPU), both a CPU and a GPU, or any other type of processing unit. Each of the one or more processors may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processors may also be responsible for executing computer applications stored in the memory, which can be associated with types of volatile and/or nonvolatile memory.

The computing system can also have one or more communication interfaces. The communication interfaces can include transceivers, modems, interfaces, antennas, telephone connections, and/or other components that can transmit and/or receive data over networks, telephone lines, or other connections. For example, the communication interfaces can include one or more network cards that can be used to receive inputs and output results according to the above embodiments.

In some examples, the computing system can also have one or more input devices, such as a keyboard, a mouse, a touch-sensitive display, voice input device, etc., and/or one or more output devices such as a display, speakers, a printer, etc. These devices are well known in the art and need not be discussed at length here.

The computing system may also include a drive unit including a machine-readable medium. The machine-readable medium can store one or more sets of instructions, such as software or firmware, that embodies any one or more of the methodologies or functions described herein. The instructions can also reside, completely or at least partially, within the memory, processor(s), and/or communication interface(s) during execution thereof by the computing system. The memory and the processor(s) also can constitute machine readable media.

Although the invention has been described and illustrated in the foregoing illustrative examples, it is understood that numerous changes in the details of implementation of the invention can be made without departing from the spirit and scope of the invention, which is only limited by the claims that follow. Features of the disclosed embodiments can be combined and rearranged in various ways.

What is claimed is:

1. A computer-implemented method, comprising:

repeatedly receiving data, in which each datum therein has one of a plurality of categorical values associated with a categorical variable;

for each and every repetition of receiving data:

always mapping the categorical value in each datum therein to a respective, same, unique one of a plurality of colors in a color space, hereinafter the "respective, same, unique color to which the categorical value in each datum is always mapped", by:

providing at least a portion of the categorical value in each datum as a hash key to a same hashing function that is used for the each and every repetition of receiving data;

generating via the same hashing function a hash value based on the hash key; and mapping the hash value to a respective, unique, one of a plurality of colors in a color space; and transforming the respective, same, unique color to which the categorical value in each datum is always mapped to yield a minimum threshold separation between the respective colors; and displaying a graphical representation of the data, the graphical representation comprising the respective, same, unique, color to which the categorical value in each datum is always mapped and as transformed to yield the minimum threshold separation between the respective colors.

2. The computer-implemented method of claim 1, wherein mapping the hash value to the respective, unique, one of the plurality of colors in the color space comprises mapping the hash value to one or more parameters of the respective, unique, one of the plurality of colors in the color space.

3. The computer-implemented method of claim 2, wherein mapping the hash value to one or more parameters of the respective, unique, one of the plurality of colors in the color space, comprises mapping the hash value to a perceptual lightness parameter and parameters that represent the colors red, green, blue and yellow, according to a CIELAB color space model.

4. The computer-implemented method of claim 3, wherein mapping the hash value to one or more parameters of the respective, unique, one of the plurality of colors in the color space, comprises mapping the hash value to one or more parameters according to a CIELUV color space model for human perceptual uniformity of colors.

5. The computer-implemented method of claim 4, wherein mapping the hash value to the one or more parameters of the respective, unique, one of the plurality of colors in the color space, comprises mapping the hash value to hue, chroma, and luminance parameters of a cylindrical color space model in accordance with a human perception of color.

6. The computer-implemented method of claim 1, wherein transforming the respective, same, unique color to which the categorical value in each datum is always mapped to yield a minimum threshold separation between the respective colors comprises adjusting a location of at least one of the respective, same, unique colors in the color space to provide a separation between the locations of the at least one of the respective, same, unique colors and another one of the respective, same, unique colors in the color space sufficient to yield the minimum threshold separation between the respective colors.

7. A computing system, comprising:

one or more processors;

memory storing computer-executable instructions that, when executed by the one or more processors, cause the one or more processors to perform operations comprising:

repeatedly receiving data, in which each datum therein has one of a plurality of categorical values associated with a categorical variable;

for each and every repetition of receiving data:

always mapping the categorical value in each datum therein to a respective, same, unique one of a plurality of colors in a color space, hereinafter the "respective, same, unique color to which the categorical value in each datum is always mapped", by:

providing at least a portion of the categorical value in each datum as a hash key to a same hashing function that is used for the each and every repetition of receiving data;

generating via the same hashing function a hash value based on the hash key; and mapping the hash value to a respective, unique, one of a plurality of colors in a color space; and transforming the respective, same, unique color to which the categorical value in each datum is always mapped to yield a minimum threshold separation between the respective colors; and displaying a graphical representation of the data, the graphical representation comprising the respective, same, unique color to which the categorical value in each datum is always mapped and as transformed to yield the minimum threshold separation between the respective colors.

8. The computing system of claim 7, wherein mapping the hash value to the respective, unique, one of the plurality of colors in the color space comprises mapping the hash value to one or more parameters of the respective, unique, one of the plurality of colors in the color space.

9. The computing system of claim 8, wherein mapping the hash value to one or more parameters of the respective, unique, one of the plurality of colors in the color space, comprises mapping the hash value to a perceptual lightness parameter and parameters that represent the colors red, green, blue and yellow, according to a CIELAB color space model.

10. The computing system of claim 8, wherein mapping the hash value to one or more parameters of the respective, unique, one of the plurality of colors in the color space, comprises mapping the hash value to one or more parameters according to a CIELUV color space model for human perceptual uniformity of colors.

11. The computing system of claim 10, wherein mapping the hash value to one or more parameters of the respective, unique, one of the plurality of colors in the color space, comprises mapping the hash value to hue, chroma, and luminance parameters of a cylindrical color space model in accordance with a human perception of color.

12. The computing system of claim 7, wherein transforming the respective, same, unique color to which the categorical value in each datum is always mapped to yield a minimum threshold separation between the respective colors comprises adjusting a location of at least one of the respective, same, unique colors in the color space to provide a separation between the locations of the at least one of the respective, same, unique colors and another one of the respective, same, unique colors in the color space sufficient to yield the minimum threshold separation between the respective colors.

13. One or more non-transitory computer-readable media storing computer-executable instructions for an event query host that, when executed by one or more processors, cause the one or more processors to perform operations comprising:

repeatedly receiving data, in which each datum therein has one of a plurality of categorical values associated with a categorical variable;

for each and every repetition of receiving data:

always mapping the categorical value in each datum therein to a respective, same, unique one of a plurality of colors in a color space, hereinafter the "respective, same, unique color to which the categorical value is each datum is always mapped", by:

providing at least a portion of the categorical value in each datum as a hash key to a same hashing function that is used for the each and every repetition of receiving data;

generating via the same hashing function a hash value based on the hash key; and mapping the hash value to a respective, unique, one of a plurality of colors in a color space; and transforming the respective, same, unique color to which the categorical value in each datum is always mapped to yield a minimum threshold separation between the respective colors; and displaying a graphical representation of the data, the graphical representation comprising the respective, same, unique color to which the categorical value in each datum is respectively always mapped and as transformed to yield the minimum threshold separation between the respective colors.

14. The one or more non-transitory computer-readable media of claim 13, wherein mapping the hash value to the respective, unique, one of the plurality of colors in the color space, comprises mapping the hash value to one or more parameters of the respective, unique, one of the plurality of colors in the color space.

15. The one or more non-transitory computer-readable media of claim 14, wherein mapping the hash value to one or more parameters of the respective, same, unique one of the plurality of colors in the color space, comprises mapping the hash value to a perceptual lightness parameter and parameters that represent the colors red, green, blue and yellow, according to a CIELAB color space model.

16. The one or more non-transitory computer-readable media of claim 14, wherein mapping the hash value to one or more parameters of the respective, unique, one of the plurality of colors in the color space, comprises mapping the hash value to one or more parameters according to a CIELUV color space model for human perceptual uniformity of colors.

17. The one or more non-transitory computer-readable media of claim 13, wherein transforming the respective, same, unique color to which the categorical value in each datum is always mapped to yield a minimum threshold separation between the respective colors comprises adjusting a location of at least one of the respective, same, unique colors in the color space to provide a separation between the locations of the at least one of the respective, same, unique colors and another one of the respective, same, unique colors in the color space sufficient to yield the minimum threshold separation between the respective colors.

* * * * *